Sept. 8, 1936.  H. PAXTON  2,053,493
CLEAN-OUT MECHANISM
Filed April 25, 1934
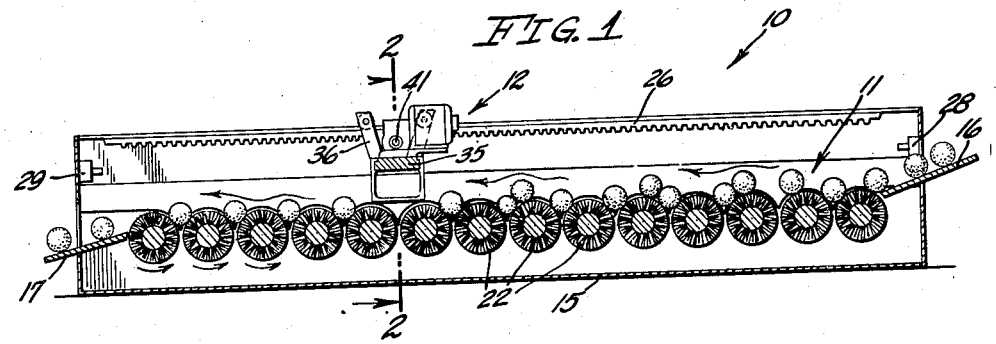
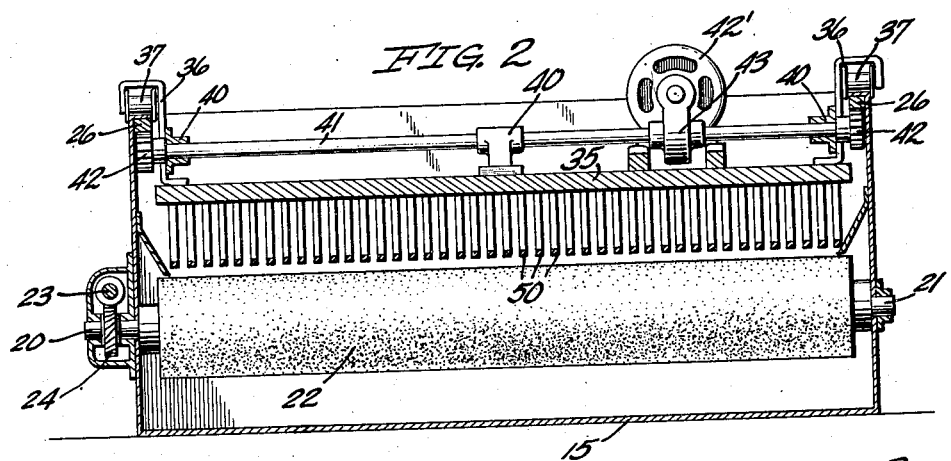
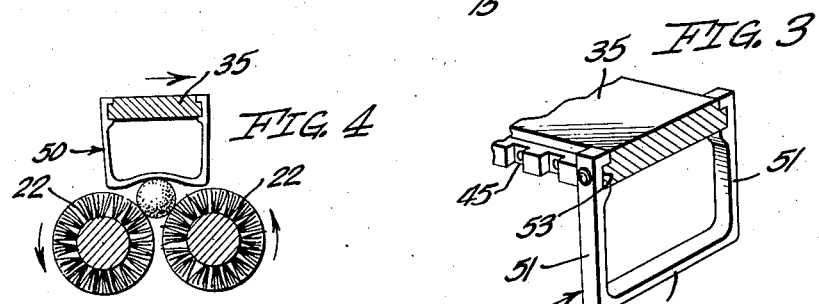
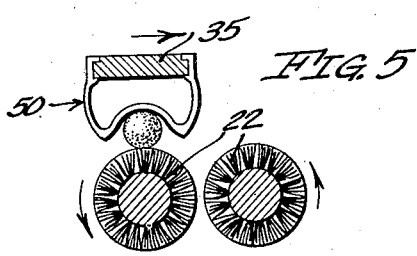
INVENTOR
HALE PAXTON
BY
ATTORNEY Patented Sept. 8, 1936

2,053,493

UNITED STATES PATENT OFFICE 2,053,493

CLEAN-OUT MECHANISM

Hale Paxton, Santa Ana, Calif., assignor to Paxton Credit Corporation, Santa Ana, Calif., a corporation of California Application April 25, 1934, Serial No. 722,282

2 Claims. (Cl. 146—202)

My invention relates to machines employed by packing houses for treating fruits and vegetables in the preparation of these for market and more particularly to an improved type of clean-out mechanism to be used in combination with a fruit washing, drying, or polishing machine.

The type of fruit treating machine my invention is particularly adapted to be used with embodies a plurality of cylindrical elements slightly larger in diameter than the fruit to be treated, these elements being rotatably mounted on parallel, fixed axes lying in a given horizontal plane, thus closely spacing the elements so that a series of troughs or channels are provided by the combined upper surface of these elements for supporting rows of fruit while it is being washed, dried, polished or what not.

These elements are all rotated in the same direction so that fruit resting in any of said channels is continuously rotated. Fruit is fed into the machine by rolling it over the endmost element of the series away from which the upper surfaces of the elements travel owing to their rotation. After the first channel is occupied by a row of fruit, the next fruit fed to the machine engages the first occupants of the first channel, causing them to jump over the second rotating element into the second channel.

Continued feeding of fruit to the machine thus causes the stream of fruit to be advanced in the same manner from channel to channel through the entire machine. When the stream of fruit ceases as the last of a given lot is fed to the machine, it becomes necessary to clean out the fruit resting in the channels of the machine.

An object of my invention is to provide a mechanism for automatically cleaning out the residual fruit in a fruit treating machine.

Another object of my invention is the provision of a clean-out mechanism which will be positive and thorough and yet gentle in operation so as not to bruise or otherwise injure such perishable fruits as apples, oranges, and the like.

A further object of my invention is to provide means on a fruit treating machine for increasing the scrubbing action of the treating elements on the fruit.

Another object of my invention is to provide clean-out means for a fruit treating machine that will also serve to increase the scrubbing action of the treating elements on the fruit.

Other objects and advantages will be made manifest in the following description taken in connection with the accompanying drawing, in which:

Fig. 1 is a semi-diagrammatically vertical sectional view of a preferred embodiment of my invention.

Fig. 2 is an enlarged, vertical, sectional view taken on the line 2—2 of Fig. 1.

Fig. 3 is a fragmentary, perspective view of a portion of the machine shown in Figs. 1 and 2.

Figs. 4 and 5 are diagrammatic, sectional views illustrating the operation of certain parts of the machine.

Referring specifically to the drawing, a fruit washing machine 10 comprising a preferred embodiment of my invention is shown in Fig. 1, this machine including a washing unit 11 and a clean-out mechanism 12.

The washer 11 includes a tank 15 having inclined inlet and outlet boards 16 and 17, respectively. Rotatably mounted on trunnions 20 and 21 within the tank 15 is a plurality of brushes 22, these being driven in a common direction of rotation at a uniform speed, the latter being operatively connected to the trunnions 20 by suitable spiral gearing 24 as shown in Fig. 2. Fixed to the upper, inside edges of the side walls of the tank 15 are toothed racks 26 and mounted on the intake and outlet ends of the tank 15 are control switches 28 and 29, respectively.

The clean-out mechanism 12 includes a crossbeam 35 supported within the tank 15 by hangers 36. Rotatably mounted on the upper ends of the hangers 36 are flanged rollers 37, the latter resting on the upper edges of the side walls of the tank 15 as shown in Fig. 2. Journalled on the beam 35 in suitable bearings 40 is a shaft 41 having pinions 42 fixed on its opposite ends, the pinions 42 meshing with the aforementioned racks 26. Mounted on the beam 35 is a reversible electric motor 42' which drives the shaft 41 through a suitable speed reduction unit 43. Formed on the edges of the beam 35 are equally spaced notches 45 as shown in Fig. 3.

Removably secured to the beam 35 are U-shaped pressure elements 50, each of these being formed of a single piece of rubber to provide vertical legs 51 and a horizontal portion 52. The upper ends of the legs 51 are formed to provide elements 53. The members 50 are secured to the beam 35 by the notches 45 which receive the upper ends of the legs 51 as shown.

Operation

The clean-out mechanism 12 of my invention is particularly designed for continuous reciprocation in a right line path so as to remain at all times closely over the brushes as shown in Figures 1 and 2. The reversing switches 28 and 29 cause a change of direction in the movement of the mechanism 12 at opposite ends of the machine so that as soon as the mechanism reaches an end of the machine, this motion is reversed and the mechanism started backwardly toward the opposite end of the machine.

As a result of the mechanism 12 operating in this manner, the clean-out elements 50 engage the fruit and cause this to move forwardly in advance of the clean-out mechanism whenever the latter travels in the same direction as the fruit travels through the machine and as indicated by the arrows in Figure 1. When travelling in the reverse direction, however, the fruit engaged by the fingers 50 is being rotated in such a manner that the fruit rolls underneath these fingers as shown in Figure 4. In some cases, the fruit passes under the clean-out elements 50 while the latter are disposed directly over one of the brushes 22, as illustrated in Figure 5. When the mechanism 12 is travelling in a reverse direction, there is of course a constant stream of fruit across the brushes 22, passing underneath and between the clean-out elements 50. A substantial downward pressure is exerted by the elements 50 against the fruit thus passing therebeneath which urges the fruit into a more forcible contact with the brushes, thereby increasing the scrubbing action of the brushes on the fruit.

Each time the mechanism 12 travels from the intake end of the machine to the discharge end thereof, all the fruit in the machine when this movement started is cleaned out and delivered over the board 17 out of the machine by the time the mechanism 12 arrives adjacent said delivery board.

It is thus seen that I have devised a simple clean-out mechanism which is inexpensive to construct and which has the beneficial effect of increasing the scrubbing action of the brushes on the fruit as well as periodically causing all of the fruit in the machine to be completely discharged therefrom.

I claim as my invention:

1. In a fruit treating apparatus the combination of: a frame; a plurality of cylindrical treating elements mounted in parallel relation on said frame and transversely of the direction of travel of fruit passing through said machine, said treating elements being driven in a common direction of rotation and providing a treating surface for said fruit characterized by a series of troughs between said elements; a clean-out member disposed above said treating elements and substantially parallel therewith; means for causing said clean-out member to travel from end to end of said apparatus along a path disposed closely above said treating elements in a continuous automatic reciprocating motion and at a relatively slow rate of speed; and flexible fruit engaging means extending downwardly from said member into the path of fruit travelling through said machine, said flexible means cleaning out of said machine the fruit disposed in advance of said means when the latter travel in the same direction as said fruit in passing through said machine, said fruit engaging means on its return movement in the opposite direction engaging fruit in said troughs, pressing said fruit against said treating elements and permitting said fruit to pass underneath said fruit engaging means in the normal direction of travel of fruit through said machine.

2. A combination as in claim 1 in which said yieldable fruit engaging means comprises a row of closely spaced U-shaped elements formed of resilient material, said individual resilient elements lying in planes parallel with the direction of travel of said clean-out member.

HALE PAXTON.